United States Patent
Sung et al.

(10) Patent No.: US 10,961,333 B2
(45) Date of Patent: Mar. 30, 2021

(54) ETHYLENE VINYL ACETATE COPOLYMER AND METHOD OF PREPARING THE SAME

(71) Applicant: LG Chem, Ltd., Seoul (KR)

(72) Inventors: Yutaek Sung, Daejeon (KR); Youn Sun Nam, Daejeon (KR); Eun Jung Joo, Daejeon (KR); Choong Hoon Lee, Daejeon (KR); Dae Young Shin, Daejeon (KR); Sungho Choi, Daejeon (KR); Juho Yoon, Daejeon (KR); Young Hoon Na, Daejeon (KR); Hyojoon Lee, Daejeon (KR)

(73) Assignee: LG Chem, Ltd.

( * ) Notice: Subject to any disclaimer, the term of this patent is extended or adjusted under 35 U.S.C. 154(b) by 183 days.

(21) Appl. No.: 16/464,469

(22) PCT Filed: Aug. 31, 2018

(86) PCT No.: PCT/KR2018/010168
§ 371 (c)(1),
(2) Date: May 28, 2019

(87) PCT Pub. No.: WO2019/124675
PCT Pub. Date: Jun. 27, 2019

(65) Prior Publication Data
US 2020/0140586 A1     May 7, 2020

(30) Foreign Application Priority Data

Dec. 18, 2017   (KR) .................. 10-2017-0174518

(51) Int. Cl.
*C08F 210/02*     (2006.01)
*C08F 218/08*     (2006.01)
(Continued)

(52) U.S. Cl.
CPC ............ *C08F 210/02* (2013.01); *C08F 10/02* (2013.01); *C08F 218/08* (2013.01); *C08F 2/01* (2013.01); *C08F 2800/20* (2013.01)

(58) Field of Classification Search
CPC ........ C08F 18/08; C08F 218/08; C08F 10/02; C08F 210/02; C08F 2/01
See application file for complete search history.

(56) References Cited

U.S. PATENT DOCUMENTS 2,657,188 A * 10/1953 Denison .............. C08L 2666/04
                                                  524/315
5,227,445 A *  7/1993 Berger .................. C08F 210/02
                                                  526/331
(Continued)

FOREIGN PATENT DOCUMENTS

DE     1520227 A  *  1/1970
DE     1995471 A  * 12/1970 .............. C08F 15/02
(Continued)

OTHER PUBLICATIONS

Arsac A, Carrot C, Guillet J. Rheological characterization of ethylene vinyl acetate copolymers. Journal of applied polymer science. Dec. 9, 1999;74(11):2625-30.
(Continued)

*Primary Examiner* — Rip A Lee
(74) *Attorney, Agent, or Firm* — Lerner, David, Littenberg, Krumholz & Mentlik, LLP

(57) ABSTRACT

An ethylene vinyl acetate copolymer with a high degree of cross-linking and a method of preparing the same are provided, by controlling a temperature and polymerization heat in an autoclave reactor during polymerization, even when a reduced amount of a cross-linking agent is used.

13 Claims, 1 Drawing Sheet

(51) Int. Cl.
*C08F 10/02* (2006.01)
*C08F 2/01* (2006.01)

(56) References Cited

U.S. PATENT DOCUMENTS

| | | | | |
|---|---|---|---|---|
| 6,610,797 | B1 * | 8/2003 | Deckers | C10L 1/1973 |
| | | | | 526/64 |
| 7,803,965 | B2 * | 9/2010 | Dafinger | C07C 67/055 |
| | | | | 560/248 |
| 10,766,984 | B2 * | 9/2020 | Lammens | B01J 3/04 |
| 2002/0028896 | A1 | 3/2002 | Garcia-Franco et al. | |

FOREIGN PATENT DOCUMENTS

| | | | | | |
|---|---|---|---|---|---|
| DE | | 2403516 | A1 * | 8/1975 | ............ C08F 10/02 |
| DE | | 161028 | A1 * | 8/1984 | ............ C08F 210/02 |
| EP | | 2698830 | A1 | 2/2014 | |
| JP | | H1045838 | A | 2/1998 | |
| JP | | 2017-115118 | A * | 6/2017 | ............ C08F 210/02 |
| JP | | 2017095606 | A | 6/2017 | |
| KR | | 20100082923 | A | 7/2010 | |
| KR | | 20110064806 | A | 6/2011 | |
| KR | | 101349450 | B1 | 1/2014 | |
| KR | | 101504435 | B1 | 3/2015 | |
| KR | | 20160092288 | A | 8/2016 | |
| KR | | 101699183 | B1 | 1/2017 | |
| RU | | 2146684 | C1 * | 12/1998 | ............ C08F 210/02 |
| RU | | 2557656 | C1 * | 7/2015 | ............ C08F 210/02 |
| WO | WO 2019/088664 | | A2 * | 5/2019 | ............ C08F 210/02 |

OTHER PUBLICATIONS

International Search Report for PCT/KR2018/010168 dated Jan. 2, 2019.
Extended European Search Report for Application No. EP18884842.8 dated Nov. 27, 2019, 5 pages.

* cited by examiner

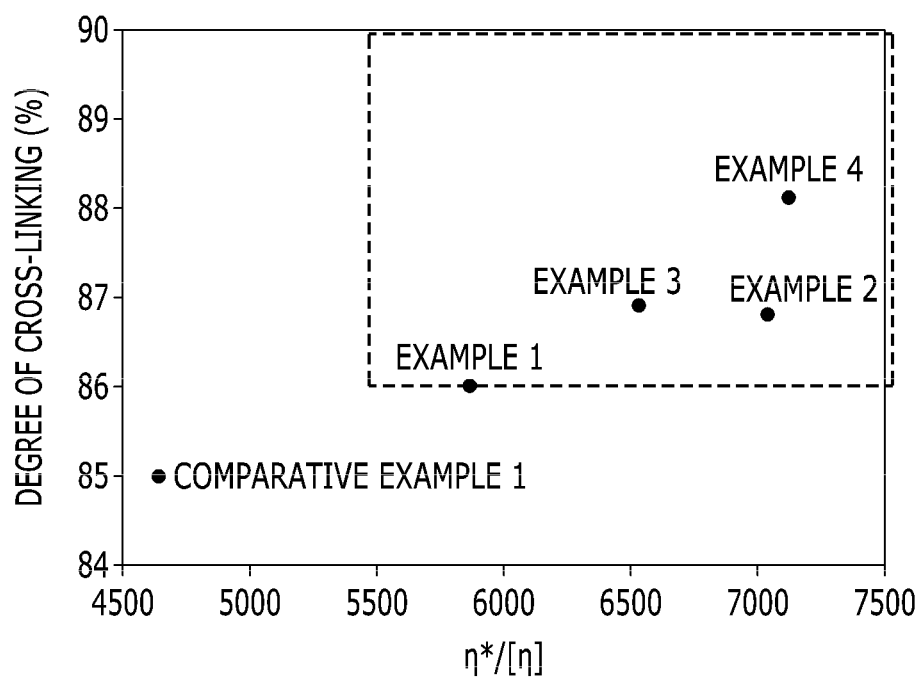

ETHYLENE VINYL ACETATE COPOLYMER AND METHOD OF PREPARING THE SAME

CROSS-REFERENCE TO RELATED APPLICATIONS

This application is a national phase entry under 35 U.S.C. § 371 of International Application No. PCT/KR2018/010168, filed Aug. 31, 2018, which claims priority to Korean Patent Application No. 10-2017-0174518, filed Dec. 18, 2017, the disclosures of which are incorporated herein by reference.

TECHNICAL FIELD

The present invention relates to an ethylene vinyl acetate copolymer and a method of preparing the same, and more particularly, to an ethylene vinyl acetate copolymer with excellent physical properties such as mechanical strength along with a high degree of cross-linking, and a method of preparing the ethylene vinyl acetate copolymer.

BACKGROUND ART

Ethylene vinyl acetate is a copolymer of ethylene and vinyl acetate, has a very wide range of use up to a soft material such as a hot melt adhesive from a hard material depending on a content of the vinyl acetate, and has low crystalline properties and excellent low temperature properties as well as excellent impact resistance compared with polyethylene.

Ethylene vinyl acetate is a thermoplastic polymer but has rubber-like properties, excellent electrical insulating properties and voltage withstanding properties, and excellent transparency, barrier properties, adhesive properties, ultraviolet (UV) properties, and the like, and thus is being widely used in a tube, a packaging material, a coating material of electric wire, an electrical insulating product, tape, adhesives, and various sheets, and recently, its use has gradually increased in a number of fields such as a for a protection film or a sealing material of a photoelectric element, i.e., a solar cell.

In general, an ethylene vinyl acetate copolymer is capable of being prepared in an autoclave or tubular reactor, and ethylene vinyl acetate prepared in an autoclave reactor has a wide molecular weight distribution and ethylene vinyl acetate prepared in a tubular reactor has a narrow molecular weight distribution, and it is usual to select a reactor and prepare ethylene vinyl acetate depending on uses thereof.

However, there is an advantage in using an autoclave reactor with back-mixing occurring because it is possible to maintain a uniform and high reaction temperature, thereby producing an ethylene vinyl acetate copolymer with a higher content of vinyl acetate when compared using a tubular reactor wherein mixing occurs based on a turbulent plug flow.

Meanwhile, it is known that an ethylene vinyl acetate copolymer has high transparency and adherence but has low mechanical strength compared with polyethylene.

Recently, there have been many attempts to use an ethylene vinyl acetate copolymer product as a sealing material for protecting a cell of a solar module from moisture and dust, and in this case, as mechanical strength is better, higher performance of a sealing member is achieved.

Accordingly, there has been a need for research into a method for enhancing mechanical strength of an ethylene vinyl acetate copolymer.

DISCLOSURE

Technical Problem

It is an object of the present invention to solve the above technical problems and to provide an ethylene vinyl acetate copolymer and a method of preparing the same that controls a temperature and polymerization heat in an autoclave reactor during polymerization to achieve a high degree of cross-linking even when a reduced amount of a cross-linking agent is used.

Technical Solution

In order to solve the problem, an embodiment of the present invention provides an ethylene vinyl acetate copolymer satisfying conditions (1) to (4) below.

(1) Degree of cross-linking: 85% or greater
(2) Content of vinyl acetate: 25 to 35 wt % based on total weight of the copolymer
(3) Melt index (190° C., 2.16 kg): 20 to 30 g/10 min
(4) Ratio of $\eta^*/[\eta]$: 5500 to 7500
($\eta^*$ is complex viscosity at zero shear measured at 160° C. and $[\eta]$ is intrinsic viscosity measured at 25° C.)

Another embodiment of the present invention provides a method of preparing the ethylene vinyl acetate copolymer, including: polymerizing an ethylene monomer and a vinyl acetate monomer in an autoclave reactor in the presence of an initiator, wherein the reactor includes a reaction region with at least three stages, satisfying the following temperature conditions, wherein temperature T1 of a reaction region including one stage or more from the lowermost of the reactor>temperature T2 of a reaction region including one stage or more from the uppermost of the reactor>temperature T3 of a reaction region including one stage or more therebetween, and $\Delta T/Q<2.5$ is satisfied, wherein $\Delta T$ is a difference between T1 and T2 and Q is polymerization heat due to a temperature difference between a temperature of an ethylene vinyl acetate copolymer prepared in the reactor and an input temperature of the monomers input to the reactor.

Advantageous Effects

The ethylene vinyl acetate copolymer according to the present invention may have optimized physical properties along with a high degree of cross-linking to achieve an excellent effect in terms of mechanical strength or the like. Accordingly, the ethylene vinyl acetate copolymer may be usefully used in a solar module.

According to the method of preparing an ethylene vinyl acetate copolymer according to the present invention, an ethylene vinyl acetate copolymer with a high degree of cross-linking is prepared by controlling the temperature and polymerization heat in an autoclave reactor during polymerization, even when a reduced amount of a cross-linking agent is used.

DESCRIPTION OF THE DRAWING

FIG. 1 is a graph showing a correlation between a ratio of $\eta^*/[\eta]$ and a degree of cross-linking in the ethylene vinyl acetate copolymers of Examples 1 to 4 and Comparative Example 1.

MODE FOR INVENTION

The terminology used herein is for the purpose of describing particular embodiments only and is not intended to be limiting of the present invention. As used herein, the singular forms are intended to include the plural forms as well, unless the context clearly indicates otherwise. It will be further understood that the terms "comprise", "include", or "have", when used in this specification, specify the presence of stated features, steps, constituent elements, or a combination thereof, but do not preclude the presence or addition of one or more other features, steps, constituent elements, or a combination thereof.

In the specification, unless particularly indicated herein, "room temperature" refers to a temperature of 23±2° C., and specifically, 25° C.

The present invention may be embodied in many different forms and may have various modifications, thus it will be described below with regard to particular exemplary embodiments. However, the features of the present invention should not be limited by the accompanying drawings, and it is to be appreciated that all changes, equivalents, and substitutes that do not depart from the spirit and technical scope of the present invention are encompassed in the present invention.

Hereinafter, a method of preparing an ethylene vinyl acetate copolymer according to an exemplary embodiment of the present invention is described in more detail.

The ethylene vinyl acetate copolymer according to an exemplary embodiment of the present invention may satisfy the following conditions (1) to (4).

(1) Degree of cross-linking: 85% or greater
(2) Content of vinyl acetate: 25 to 35 wt % based on total weight of the copolymer
(3) Melt index (190° C., 2.16 kg): 20 to 30 g/10 min
(4) Ratio of η*/[η]: 5500 to 7500
(η* is complex viscosity at zero shear measured at 160° C. and [η] is intrinsic viscosity measured at 25° C.)

A degree of cross-linking of the ethylene vinyl acetate copolymer may be increased as a portion above a peak molecular weight (Mp) is increased in gel permeation chromatography (GPC). The portion above Mp may be increased by increasing a high molecular weight fraction and a long chain branch (LCB).

According to the present invention, as described below, the temperature and polymerization heat in an autoclave reactor may be controlled during polymerization, thus a degree of cross-linking of an ethylene vinyl acetate copolymer may be increased, even when a reduced amount of a cross-linking agent is used.

Specifically, the ethylene vinyl acetate copolymer according to an exemplary embodiment of the present invention may have a degree of cross-linking of equal to or greater than 85%. As such, the ethylene vinyl acetate copolymer may have a high degree of cross-linking, thus may have an enhanced mechanical strength property while maintaining excellent adherence. When the degree of cross-linking is less than 85%, the mechanical strength property and adherence may be deteriorated. More specifically, the ethylene vinyl acetate copolymer may have a degree of cross-linking of 85 to 95% or 86 to 90%.

According to the present invention, a degree of cross-linking of an ethylene vinyl acetate copolymer may be determined by adding a cross-linking agent to an ethylene vinyl acetate copolymer to prepare a sheet, thermally laminating the sheet, putting the thermally laminated sheet in toluene and then drying it, measuring the weight of the dried sheet and calculating the weight ratio of the weight of the sheet after it is put in toluene and dried, to the weight of the sheet prior to putting the sheet in toluene. Particularly, a cross-linking agent may be mixed with an ethylene vinyl acetate (EV) copolymer as a base resin to prepare the sheet, then the sheet may be cross-linked in laminating equipment at 140° C. for 14 min and 30 s, and the cross-linked sheet is put in toluene for 15 h, and then is dried for 3 h to measure the weight of the sheet. Subsequently, a degree of cross-linking may be calculated according to Equation 1 below using a measured weight $W_i$ of a sheet prior to putting the sheet in toluene and a weight $W_d$ of a sheet after it is put in toluene and dried.

$$\text{Degree of cross-linking}(\%) = (W_d/W_i) \times 100 \quad \text{[Equation 1]}$$

The ethylene vinyl acetate copolymer may include 25 to 35 wt % of vinyl acetate based on a total weight of the copolymer.

When the content of the vinyl acetate in the ethylene vinyl acetate copolymer is less than 25 wt %, there may be a degradation in elasticity, flexibility, and adherence, and when a content of vinyl acetate in the ethylene vinyl acetate copolymer is greater than 35 wt %, there may be a degradation in weather resistance. More specifically, the content of vinyl acetate may be 27 to 30 wt %, 27.9 to 29 wt %, or 27.9 to 28.5 wt % based on a total weight of the copolymer.

The ethylene vinyl acetate copolymer may have a melt index (MI) of 20 to 30 g/10 min measured at 190° C. with a load of 2.16 kg. When the copolymer has a low melt index in the above range as well as the high degree of cross-linking and content of vinyl acetate, excellent processability may be achieved while maintaining excellent mechanical properties. When the melt index is less than 20 g/10 min, there may be a degradation in processability. And when the melt index is greater than 30 g/10 min, there may be a degradation in mechanical properties. More specifically, the melt index of the ethylene vinyl acetate copolymer may be 22 to 28 g/10 min or 22 to 25.5 g/10 min.

The ethylene vinyl acetate copolymer may have a ratio of η*/[η] of 5500 to 7500. When the ratio of η*/[η] is less than 5500, there may be degradation in a degree of cross-linking due to a reduction of a low molecular weight fraction, and when the ratio is greater than 7500, the molecular weight is excessively increased such that the processability may be deteriorated. More specifically, the ratio may be 5800 to 7200.

The complex viscosity at zero shear of η* of the ratio of η*/[η] refers to viscosity when an angular frequency is 0, and is a parameter obtained through an analysis program installed in a rotational rheometer with data points of a frequency sweep measured in an angular frequency range by using the rotational rheometer. The frequency sweep is measured at a temperature of 160° C. by using the rotational rheometer. The intrinsic viscosity of [η] is a value calculated by extrapolating a graph of reduced viscosity or inherent viscosity of a polymer solution to a zero concentration, and is obtained by measuring Newtonian viscosity with the rotational rheometer. In the present invention, the complex viscosity at zero shear of η* was measured at 160° C. according to a melt viscosity measuring method using a rotational rheometer, and the intrinsic viscosity of [ii] was measured by measuring Newtonian viscosity at room temperature, specifically at 25° C., with the rotational rheometer.

In addition, the ethylene vinyl acetate copolymer may have a number average molecular weight (Mn) of 16,000 to 18,000 g/mol while satisfying the above conditions (1) to (4). Due to the high number average molecular weight in the above range, further enhanced mechanical strength may be achieved. More specifically, the ethylene vinyl acetate copolymer may have a number average molecular weight of 16,500 to 17,800 g/mol.

The ethylene vinyl acetate copolymer may have a molecular weight distribution (MWD) of 3.0 to 4.0. The molecular weight distribution refers to a radio (Mw/Mn) of a weight average molecular weight (Mw) to a number average molecular weight (Mn), and when the ethylene vinyl acetate copolymer has the molecular weight distribution in the above range, processability and mechanical strength may be balanced. More specifically, the molecular weight distribution may be 3.2 to 3.5.

In the present invention, a molecular weight distribution (MWD), a weight average molecular weight (Mw), and a number average molecular weight (Mn) may be measured using size-exclusion chromatography (SEC). Particularly, an ethylene vinyl acetate copolymer sample is dissolved in 1,2,4-trichlorobenzene (1,2,4-TCB), and then the weight average molecular weight and the number average molecular weight are respectively obtained at a temperature of 125° C. and a flow rate of 1 ml/min using 1,2,4-TCB as a mobile phase, and the molecular weight distribution (ratio of weight average molecular weight/number average molecular weight) is calculated therefrom. Herein, PLgel 10 μm Mixed-B (available from Agilent) and the like may be used as the column of the SEC.

The above physical properties of the ethylene vinyl acetate copolymer may be achieved by reducing the temperature difference in a reactor and lowering the polymerization heat during polymerization using an autoclave reactor.

Particularly, according to an embodiment of the present invention, ethylene vinyl acetate may be prepared using a preparing method including polymerizing an ethylene monomer and a vinyl acetate monomer in an autoclave reactor in the presence of an initiator, wherein the reactor may include a reaction region with at least three stages and satisfying the following temperature conditions, wherein a temperature T1 of a reaction region including one stage or more from the lowermost of the reactor>a temperature T2 of a reaction region including one stage or more from the uppermost of the reactor>a temperature T3 of a reaction region including one stage or more therebetween, and $\Delta T/Q<2.5$ may be satisfied, wherein $\Delta T$ is a difference between T1 and T2 (T1-T2) and Q is polymerization heat due to a temperature difference between a temperature of an ethylene vinyl acetate copolymer prepared in the reactor and an input temperature of the monomers input to the reactor.

More particularly, the reactor may include a reaction region with 11 stages, T1 is a temperature of a reaction region including five stages from the lowermost, T2 is a temperature of a reaction region including four stages from the uppermost, and T3 is a temperature of a reaction region including two stages therebetween.

When a temperature condition in the reactor is $\Delta T/Q \geq 2.5$, the above physical properties of the ethylene vinyl acetate copolymer may not be achieved. Specifically, $0.5 \leq \Delta T/Q < 2.5$, and more specifically, $0.9 \leq \Delta T/Q \leq 2.2$.

A temperature of each reaction region in the autoclave reactor may be measured by a thermocouple installed in the corresponding region, and in the present invention, a temperature of the uppermost stage of each reaction region is measured. For example, in a reactor with 11 stages, T1 is a temperature measured at a fifth stage, T2 is a temperature measured at an eleventh stage, and T3 is a temperature measured at a seventh stage.

In a condition that satisfies the aforementioned ratio of $\Delta T/Q$, $\Delta T$ may be greater than 0 and may be equal to or less than 30° C., and more specifically, 10 to 25° C.

Polymerization heat Q due to a temperature difference of an ethylene vinyl acetate copolymer prepared in an autoclave reactor and the monomers input into an autoclave reactor may be 10 to 15 gcal, specifically, 10 to 11 gcal.

When a condition of $\Delta T$ and Q as well as the above condition of $\Delta T/Q$ is satisfied, the above physical properties of the ethylene vinyl acetate copolymer may be further easily achieved.

More specifically, the aforementioned temperature condition such as $\Delta T/Q$ may be satisfied, and simultaneously, a temperature in the autoclave reactor may be 150 to 220° C., T1 may be 180 to 220° C., T2 may be 160 to 190° C., and T3 may be a temperature lower than T2. As such, the polymerization is conducted in an optimized temperature range depending on a position of a reactor, and thus, a degree of cross-linking and of polymerization conversion may be increased, and as a result, productivity may be enhanced.

In a condition that satisfies the above temperature range, a pressure of the autoclave reactor may be 1800 to 2100 bar.

The pressure of the reactor may refer to pressure measured by a pressure sensor installed inside the reactor, and when the pressure of the reactor is in the above range, an ethylene vinyl acetate copolymer with mechanical properties such as excellent tensile strength may be prepared with a high conversion rate.

In the method of preparing an ethylene vinyl acetate copolymer, a vinyl acetate monomer and an ethylene monomer may each be input in a gas phase, and in this case, a temperature of monomers input into the autoclave reactor may be 10 to 60° C., and more specifically, 30 to 60° C.

The vinyl acetate monomer may be used in an amount of 25 to 35 wt %, more specifically 27 to 30 wt %, based on a total weight of an ethylene monomer and a vinyl acetate monomer.

An initiator used in the method of preparing the ethylene vinyl acetate copolymer may be an organic peroxide-based low temperature initiator, or a high temperature initiator, and any one or a mixture of two or more of them may be used.

The low temperature initiator may refer to an initiator capable of initiating and/or promoting a reaction between the ethylene monomer and the vinyl acetate monomer at a temperature of equal to or greater than 130° C. and less than 170° C., and the high temperature initiator may refer to an initiator capable of initiating and/or promoting the reaction at a temperature of equal to or greater than 170° C. and equal to or less than 230° C.

In general, in case only one initiator is used in the preparation of an ethylene vinyl acetate copolymer, when the reaction temperature is excessively low, the initiator is not capable of initiating a reaction, and when the reaction temperature is excessively high, the initiator may be decomposed prior to polymerization of a copolymer, and thus efficiency of the initiator may decrease or a runaway reaction may occur.

Meanwhile, according to the method of preparing an ethylene vinyl acetate copolymer of one embodiment of the present invention, a polymerization temperature may be differently set depending on a position of a reactor during polymerization, and a mixture of organic peroxide-based low temperature initiator and high temperature initiator is used as an initiator, and thus, a degree of a polymerization reaction may be controlled depending on each temperature region.

Specifically, according to one embodiment of the present invention, the low temperature initiator and the high temperature initiator may be mixed in a weight ratio of 5:95 to 95:5. When the initiators are used in the above mixture ratio, a degree of the polymerization reaction may be controlled depending on each temperature region to enhance polymerization efficiency. More specifically, the low temperature initiator and the high temperature initiator may be mixed in a weight ratio of 10:90 to 90:10 or a weight ratio of 20:80 to 70:30

The low temperature initiator may initiate a polymerization reaction at a lower temperature than a common high-pressure radical polymerization reaction temperature, and for example, one or more compounds selected from the group consisting of 1,4-di(2-neodecanoylperoxyisopropyl) benzene (DIPND), cumylperoxy neodecanoate (CUPND), di(sec-butyl) peroxydicarbonate (SBPC), di(n-butyl)peroxydicarbonate (NBPC), di(2-ethylhexyl) peroxydicarbonate (EHP), tert-amylperoxy neodecanoate (TAPND), and tert-butyl peroxy neodecanoate (TBPND) may be used.

And, the high temperature initiator may initiate a polymerization reaction at a higher temperature than a common high-pressure radical polymerization reaction temperature, and for example, one or more compounds selected from the group consisting of tert-amylperoxy pivalate (TAPPI), tert-butylperoxy pivalate (TBPPI), di(3,5,5-trimethylhexanoyl) peroxide (INP), tert-amylperoxy 2-ethylhexanoate (TAPEH), tert-butylperoxy 2-ethylhexanoate (TBPEH), tert-butylperoxy-isobutyrate (TBPIB), tert-butylperoxy-3,5,5-trimethylhexanoate (TBPIN), and tert-butyl peroxyacetate (TBPA) may be used.

And, the low temperature initiator and the high temperature initiator may be used while being diluted in a hydrocarbon solvent at a concentration of 20 to 80 wt %, and specifically, 30 to 70 wt %. In this case, as the hydrocarbon solvent, for example, one or more selected from the group consisting of n-decane, n-octane, iso-dodecane, and iso-octane may be used, or an Isopar-series solvent, which is a commercial product mixed with hydrocarbons, may be used.

And, the total amount of the initiator including the low temperature initiator and the high temperature initiator may be equal to or greater than about 60 ppm, equal to or greater than about 70 ppm, or equal to or greater than about 80 ppm, and equal to or less than about 170 ppm, equal to or less than about 160 ppm, or equal to or less than about 150 ppm, based on a total weight of the monomers including the ethylene monomer and the vinyl acetate monomer. When an amount of the initiator used is excessively low, a reaction may not appropriately proceed, and when the amount is excessively high, a runaway reaction may occur by an abnormal reaction.

As described above, by controlling the temperature and polymerization heat depending on a position in an autoclave reactor, an ethylene vinyl acetate copolymer of which MI is reduced while having a high degree of cross-linking and vinyl acetate content has an optimized ratio of $\eta^*/[\eta]$ may be prepared.

The ethylene vinyl acetate copolymer may exhibit enhanced mechanical strength along with excellent transparency, adherence, and processability due to the optimized physical properties. Accordingly, the ethylene vinyl acetate copolymer may be used in a packaging material, a coating material of electric wire, an electrical insulating product, tape, adhesives, and various sheets, and a protection film or a sealing material of a photoelectric element such as a solar cell, and in particular, may be useful as a protection film of a photoelectric element that requires good mechanical strength along with transparency.

Accordingly, another embodiment of the present invention may provide a shaped article including the ethylene vinyl acetate copolymer, and specifically, a protection film or a sealing member of a photoelectric element.

The present invention is described in the following examples in more detail. However, the following examples are merely exemplary of the present invention, and the present invention is not limited thereto.

EXAMPLES AND COMPARATIVE EXAMPLE 72 wt % of an ethylene monomer and 28 wt % of a vinyl acetate monomer were put into an autoclave reactor including 11 stages (which is divided into a first- to fifth-stage: a lower reaction region T1, a sixth- to seventh-stage reactor: an intermediate reaction region T3, and an eighth- to eleventh-stage: an upper reaction region T2), and a reaction proceeded under the process conditions shown in the following Table 1 in the presence of a mixed initiator of TBPND and TBPPI (weight ratio of 50:50) to prepare an ethylene vinyl acetate copolymer. In this case, the autoclave reactor was set with a temperature to be lower in an order of T1>T2>T3 in the temperature range of 150 to 220° C.

TABLE 1

| Process condition | Example 1 | Example 2 | Example 3 | Example 4 | Comparative Example 1 |
|---|---|---|---|---|---|
| Pressure (bar) | 1,930 | 1,930 | 1,930 | 1,930 | 1,930 |
| monomer input temperature (° C.) | 35 | 35 | 35 | 35 | 25 |
| ΔT | 25 | 24 | 21 | 10 | 34 |
| Q (gcal) | 11.9 | 10.9 | 10.9 | 10.5 | 11.9 |
| ΔT/Q | 2.10 | 2.20 | 1.93 | 0.95 | 2.86 |
| T2 temperature (° C.) | 165 | 165 | 168 | 170 | 156 |

In Table 1 above, ΔT is a difference between T1 and T2 (T1-T2), wherein T1 and T2 are temperatures in fifth-stage and eleventh-stage reactors, respectively.

In addition, Q is polymerization heat calculated from a temperature difference between an ethylene vinyl acetate copolymer prepared in an autoclave reactor and the monomers input to the autoclave reactor.

Experimental Example

The physical properties of the above-prepared ethylene vinyl acetate copolymers in Examples 1 to 4 and Comparative Example 1 were measured using the following method, and are shown in Table 2 below.

(1) Vinyl acetate (VA) content (wt %): measured via near infrared spectroscopy (NIR).

(2) Degree of cross-linking (%): 4 ml of tert-butyl peroxy 2-ethylhexyl carbonate (TBEC) as a cross-linking agent, 2.5 ml of triallyl isocyanurate (TRIC), and 1 ml of silane were soaked in 500 g of each of the ethylene vinyl acetate (EV) copolymers prepared in the above examples and comparative example as a base resin, and then the resultant is extruded into sheet with an extruder. The prepared sheet was cross-linked in laminating equipment for 14 min and 30 s at 140° C., put in toluene for 15 h, dried in a convection oven for 3 h, and then weighed. A degree of cross-linking was calculated according to Equation 1 below using a measured weight $W_i$ of a sheet prior to putting in toluene and a weight $W_d$ of a sheet after putting in toluene and drying.

$$\text{Degree of cross-linking}(\%)=(W_d/W_i)\times 100 \qquad \text{[Equation 1]}$$

(3) Melt index (MI, 2.16 kg): measured at 190° C. with a load of 2.16 kg according to ASTM D1238, and represented as a weight (g) of a polymer melted for 10 min.

(4) Molecular weight distribution (MWD) and number average molecular weight (Mn): measured using size-exclusion chromatography (SEC). The measurement was conducted using a PL-GPC device (available from Agilent) using a column of PLgel 10 μm Mixed-B (available from Agilent), with 1,2,4-TCB (1,2,4-trichlorobenzene) as a mobile phase at a temperature of 125° C. and a flow rate of 1 ml/min. Particularly, each of the ethylene vinyl acetate copolymer samples of the examples and comparative example was dissolved in 1,2,4-TCB at a concentration of 10 mg/10 mL and then fed in an amount of 200 μL, and the weight average molecular weight (Mw) and the number average molecular weight (Mn) were derived using a calibration curve formed using a styrene standard, while the molecular weight distribution (ratio of weight average molecular weight/number average molecular weight) was calculated therefrom. Herein, as the polystyrene standard, 9 kinds having molecular weight (g/mol) of 9,475,000, 597,500, 19,920, 3,507,000, 224,900, 9,960, 1,956,000, 74,800, and 2,980 were used.

$$\text{Ratio of } \eta^*/[\eta] \qquad (5)$$

The complex viscosity at zero shear of $\eta^*$ was measured at 160° C. according to a melt viscosity measuring method using a rotational rheometer, and intrinsic viscosity of $[\eta]$ was obtained by measuring Newtonian viscosity at 25° C. with a rotational rheometer.

A correlation between a ratio of $\eta^*/[\eta]$ and a degree of cross-linking in the ethylene vinyl acetate copolymers of Examples 1 to 4 and Comparative Example 1 were compared, and the result is shown in FIG. 1.

TABLE 2

| | Example 1 | Example 2 | Example 3 | Example 4 | Comparative Example 1 |
|---|---|---|---|---|---|
| VA content (wt %)* | 28.3 | 27.9 | 28.3 | 28.4 | 27.6 |
| Degree of cross-linking (%) | 86.0 | 86.8 | 86.9 | 88.1 | 85.0 |
| MI (g/10 min) | 25.4 | 23.9 | 22.7 | 23.7 | 25.3 |
| Mn (g/mol) | 16,900 | 16,760 | 17,770 | 17,100 | 16,400 |
| MWD | 3.42 | 3.27 | 3.34 | 3.30 | 3.35 |
| Ratio of $\eta^*/[\eta]$ (Pa * s/P) | 5,870 | 7,040 | 6,540 | 7,133 | 4,650 |

As the experimental result, the ethylene vinyl acetate copolymers of Examples 1 to 4 which were prepared in the reactor having a controlled temperature and polymerization heat in a predetermined range according to the present invention, showed a low MI value with a high degree of cross-linking and vinyl acetate content compared with that of Comparative Example 1.

The invention claimed is:

1. An ethylene vinyl acetate copolymer satisfying conditions (1) to (4) below:
   (1) degree of cross-linking: 85% or greater
   (2) content of vinyl acetate: 25 to 35 wt % based on total weight of the ethylene vinyl acetate copolymer
   (3) melt index (190° C., 2.16 kg): 20 to 30 g/10 min
   (4) ratio of $\eta^*/[\eta]$: 5500 to 7500, and
   wherein $\eta^*$ is complex viscosity at zero shear measured at 160° C. and $[\eta]$ is intrinsic viscosity measured at 25° C.

2. The ethylene vinyl acetate copolymer of claim 1, wherein the ethylene vinyl acetate copolymer has a number average molecular weight of 16,000 to 18,000 g/mol.

3. The ethylene vinyl acetate copolymer of claim 1, wherein the ethylene vinyl acetate copolymer has a molecular weight distribution of 3.0 to 4.0.

4. A method of preparing the ethylene vinyl acetate copolymer of claim 1, comprising
   polymerizing an ethylene monomer and a vinyl acetate monomer in an autoclave reactor in the presence of an initiator,
   wherein
   the reactor comprises a reaction region with at least three stages satisfying the following temperature condition:
   a temperature T1 of a reaction region comprising one stage or more from the lowermost of the autoclave reactor>a temperature T2 comprising one stage or more from the uppermost of the autoclave reactor>a temperature T3 of a reaction region comprising one stage or more therebetween, and
   ΔT/Q<2.5 is satisfied, wherein ΔT is a difference between T1 and T2 and Q is polymerization heat due to a temperature difference between a temperature of an ethylene vinyl acetate copolymer prepared in the autoclave reactor and an input temperature of the monomers input to the autoclave reactor.

5. The method of claim 4, wherein the autoclave reactor comprises a reaction region with 11 stages, wherein the T1 is a temperature of a reaction region comprising five stages from the lowermost of the autoclave reactor, the T2 is a temperature of a reaction region comprising four stages from the uppermost of the autoclave reactor, and the T3 is a temperature of a reaction region comprising two stages therebetween.

6. The method of claim 4, wherein ΔT is greater than 0° C. and is equal to or less than 30° C.

7. The method of claim 4, wherein Q is 10 to 15 gcal.

8. The method of claim 4, wherein the temperature of T1 is 180 to 220° C. and the temperature of T2 is 160 to 190° C.

9. The method of claim 4, wherein a pressure of the autoclave reactor is 1800 to 2100 bar.

10. The method of claim 4, wherein an input temperature of monomers input into the autoclave reactor is 10 to 60° C.

11. The method of claim 4, wherein the vinyl acetate monomer is comprised in an amount of 25 to 35 wt % based on a total weight of 100 wt % of an ethylene monomer and a vinyl acetate monomer.

12. The method of claim 4, wherein the initiator comprises:
   a low temperature initiator for initiating a reaction between the ethylene monomer and the vinyl acetate monomer at a temperature of equal to or greater than 130° C. and less than 170° C.; and
   a high temperature initiator for initiating a reaction at a temperature equal to or greater than 170° C. and equal to or less than 230° C.,
   wherein a weight ratio of the low temperature initiator to the high temperature initiator is from 5:95 to 95:5.

13. The method of claim 12, wherein the low temperature initiator comprises 1,4-di(2-neodecanoylperoxyisopropyl) benzene, cumylperoxy neodecanoate, di(sec-butyl) peroxydicarbonate, di(n-butyl)peroxydicarbonate, di(2-ethylhexyl) peroxydicarbonate, tert-amylperoxy neodecanoate, or tert-butyl peroxy neodecanoate, and
   the high temperature initiator comprises tert-amylperoxy pivalate, tert-butylperoxy pivalate, di(3,5,5-trimethylhexanoyl) peroxide, tert-amylperoxy 2-ethylhexanoate, tert-butylperoxy 2-ethylhexanoate, tert-butylperoxyisobutyrate, tert-butylperoxy-3,5,5-trimethylhexanoate or tert-butyl peroxyacetate.

* * * * *